| United States Patent [19] | [11] | 4,278,732 |
|---|---|---|
| Spicuzza, Jr. | [45] | Jul. 14, 1981 |

[54] ANTILUMPING EXPANDABLE STYRENE POLYMERS

[75] Inventor: John P. Spicuzza, Jr., Mt. Lebanon, Pa.

[73] Assignee: ARCO Polymers, Inc., Philadelphia, Pa.

[21] Appl. No.: 192,670

[22] Filed: Oct. 1, 1980

[51] Int. Cl.$^3$ .................................................. C08J 9/14
[52] U.S. Cl. ...................................... 428/407; 521/57;
521/88; 521/97
[58] Field of Search ............................ 521/57; 428/407

[56] References Cited

U.S. PATENT DOCUMENTS

| 3,444,104 | 5/1969 | Immel et al. ........................ 260/2.5 |
| 3,462,293 | 8/1969 | Voris .................................... 117/100 |
| 3,520,833 | 7/1970 | Wright ................................. 260/2.5 |

*Primary Examiner*—Morton Foelak
*Attorney, Agent, or Firm*—Lewis J. Young

[57] ABSTRACT

Expandable styrene polymer particles are surface-coated with decaglyceroloctaoleate to prevent the particles from lumping together during expansion. The coating is applied by adding 0.02–0.05 part of decaglyceroloctaoleate to an aqueous suspension containing 100 parts of polymer particles subsequent to impregnating the mixture with a blowing agent, or by dry blending polymer particles with the octaoleate.

3 Claims, No Drawings

ANTILUMPING EXPANDABLE STYRENE POLYMERS

BACKGROUND OF THE INVENTION

This invention relates to a process for making expandable styrene polymer particles non-lumping on pre-expansion.

The making of low density, cellular, shaped, plastic articles from expandable particles of styrene polymer is well-known. Such particles generally contain a blowing agent which boils below the softening point of the polymer and which will cause the particles to expand when they are heated.

The particles are generally pre-expanded before introduction into the mold to provide better fusion and less density variation in the molded article. Such a pre-expansion is described in U.S. Pat. No. 3,023,175 and U.S. Pat. No. 3,577,360.

These pre-expanded particles are placed into a mold cavity which defines the shape of the desired finished articles. The particles are heated above their softening point, whereupon the particles expand to fill the mold cavity and fuse together.

An undesirable result of the pre-expansion before introduction into the mold is the tendency of the pre-expanded particles to clump together and form lumps which render the particles unsuitable for molding. These lumps cannot be properly conveyed in processing plants and are unsuitable for charging into molds of intricate contour due to improper fill-out of the molded articles. Even if reasonable fill-out is achieved, variations in density with the molded article can result and voids also occur.

Various methods have been proposed for the prevention of lumping during pre-expansion, but these have all suffered from some objectionable feature such as rapid loss of blowing agent, poor flow of the treated beads, dust problems which cause plugging of the steam ports, and often serious reduction in fusion of the particles on molding. U.S. Pat. No. 3,520,833, teaches the addition of lecithin during the impregnation of the particles with the blowing agent. Unfortunately the lecithin imparts an undesirable odor to the molded articles. U.S. Pat. No. 3,462,293, teaches to coat the particles with polymeric materials by a fluid bed process. This process involves an additional expense of fluidizing the particles and coating with the polymer latexes. U.S. Pat. No. 3,444,104 teaches the addition of calcium silico aluminate. This additive does not allow pre-puff or less than about 1 pound per cubic foot density to be prepared.

SUMMARY OF THE INVENTION

It has now been found that anti-lumping, pre-expanded particles having density of about 1-3 pcf are produced by coating styrene polymer particles with a surfactant, decaglyceroloctaoleate applied to the particles by dry blending techniques or in an aqueous suspension after impregnating the particles with expanding agent.

DETAILED DESCRIPTION OF THE INVENTION

In accordance with this invention, a variety of expandable thermoplastic homopolymers and copolymers can be rendered anti-lumping. The polymers may be derived from vinyl aromatic monomers including styrene, vinyltoluene, isopropylstyrene, alpha-methylstyrene, nuclear methylstyrenes, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

The styrene polymers can, of course, be produced by any of the known techniques, for example by suspension or mass polymerization, to obtain particles in the form of beads or pellets.

To render the polymer particles expandable, the blowing agent is incorporated into the particles, as in U.S. Pat. No. 2,983,692, by suspending the particles in water with the aid of suspending agent systems such as tricalcium phosphate in combination with an anionic surfactant.

The blowing agents are compounds which are gases or which will produce gases on heating. Preferred blowing agents include aliphatic hydrocarbons containing from 4–7 carbon atoms in the molecule, such as butane, pentane, cyclopentane, hexane, heptane, cyclohexane, and the halogenated hydrocarbons which boil at a temperature below the softening point of the polymer. Mixtures of these agents may also be used, such as a mixture of 40–60% n-pentane and 60–40% trichlorofluoromethane. Usually from 3–20% of blowing agent per 100 parts of polymers is incorporated by the impregnation.

The impregnation is conventionally carried out at temperatures ranging from about 60° to 150° C. Increasing the temperature makes the impregnation proceed at a faster rate.

After the impregnation is completed, the suspension of polymer particles is cooled to room temperatures to allow separation of the impregnated beads from the aqueous phase.

The expandable styrene polymer particles can be coated with the decaglyceroloctaoleate in any convenient manner, for example, by dry blending the polymer particles with the octaoleate in conventional dry blending equipment. In another method, the octaoleate can be added to the aqueous suspension of expandable polymer particles in which the particles were initially prepared. Further, the dried polymer particles from any type of polymerization can be suspended in aqueous medium to be impregnated with blowing agent, and the octaoleate added to this suspension slurry after impregnation but prior to separation of the impregnated particles.

The coated, impregnated particles are separated from the aqueous phase by the usual means, such as filtration in a careful manner so as not to remove the coating from the beads. The particles are then dried in air.

It will be obvious to those skilled in the art that the coating process of the present invention may also be applied to polymer particles which contain various other additives, such as dyes, pigments, self-extinguishing agents, anti-static agents, plasticizers or the like.

The invention is further illustrated by the following examples wherein parts are parts by weight unless otherwise indicated.

EXAMPLE I

To a Henschel high-intensity mixer, there was charged 100 parts of polystyrene beads having a particle size of predominantly through 16 and on 35 mesh, U.S. Standard Sieve, containing 8 parts of n-pentane blowing agent and 0.35 wt-% of STARFOL WAX CG fast cool agent (a synthetic spermaceti wax sold by Ashland Chemical Co.), and 0.05 parts of the decaglyceroloctaoleate as antilump agent. For comparison purposes, mixtures were also made of the same polystyrene beads and three known antilump agents, zinc stearate, tricalcium phosphate and Flogard ® (a calcium polysilicate sold by PPG Industries).

The mixtures were blended at 610 rpm for 25 seconds and the speed of the mixer was then increased to 1220 rpm for 5 seconds and the mixer allowed to empty while still rotating. The peripheral speeds represented by the rpms were 544 and 1086 inches per second, respectively. Each mixture was separately pre-expanded in a Rodman pre-expander as described in U.S. Pat. No. 3,023,175 using in each case a steam pressure of 20 psig and feed rate of 200 lbs./hr. The pre-expanded beads having a bulk density shown in the Table were recovered from the bead hopper, were allowed to air dry in paper containers for approximately 18 hours, and then were screened through a No. 3½ mesh U.S. Standard Sieve. The percent lumping was determined from the weight of the beads which were retained on the screen. The results are shown in the Table.

TABLE

| Antilump Agent | Density, pcf | Lumps, % |
| --- | --- | --- |
| None | 1.19 | 30.3 |
| Flogard ® | 1.26 | 15.4 |
| Tricalcium Phosphate | 1.18 | 16.4 |
| Zinc Stearate | 1.24 | 7.0 |
| Decaglyceroloctaoleate | 1.30 | 0.0 |

These data clearly indicate the powerful antilumping property of decaglyceroloctaoleate.

I claim:

1. Expandable styrene polymer particles which will not lump during pre-expansion, comprising styrene polymer particles containing a blowing agent and having on their surface from 0.02 to 0.05 percent by weight based on polymer of decaglyceroloctaoleate.

2. The composition of claim 1 wherein said styrene polymer is polystyrene.

3. The composition of claim 1 wherein said styrene polymer is a copolymer of a vinylaromatic monomer with a minor amount of maleic anhydride.

* * * * *